May 23, 1961 C. R. GILKISON 2,985,327
BOAT CARRIER AND HOIST FOR AUTOMOBILES
Filed March 3, 1959 2 Sheets-Sheet 1
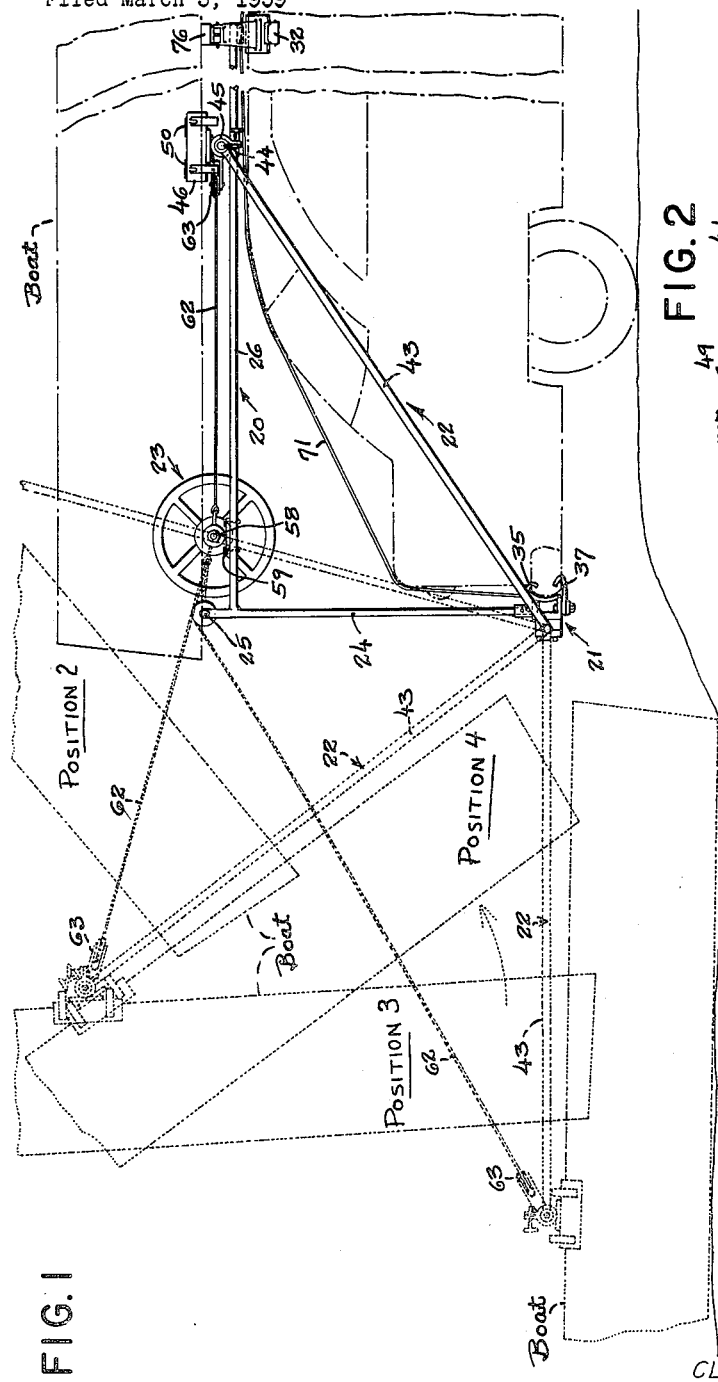
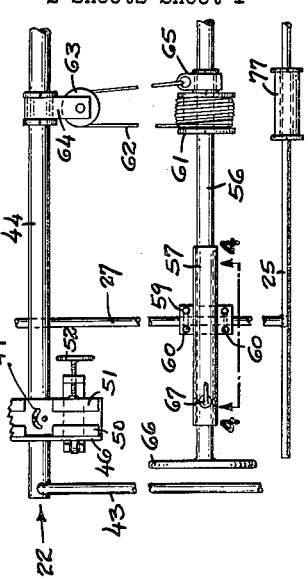
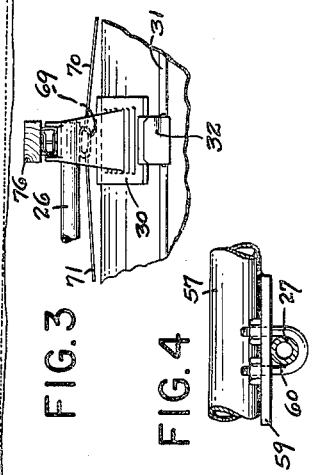
INVENTOR.
CLEMMETT R. GILKISON
BY
ATTORNEYS May 23, 1961  C. R. GILKISON  2,985,327
BOAT CARRIER AND HOIST FOR AUTOMOBILES
Filed March 3, 1959  2 Sheets-Sheet 2
FIG.5
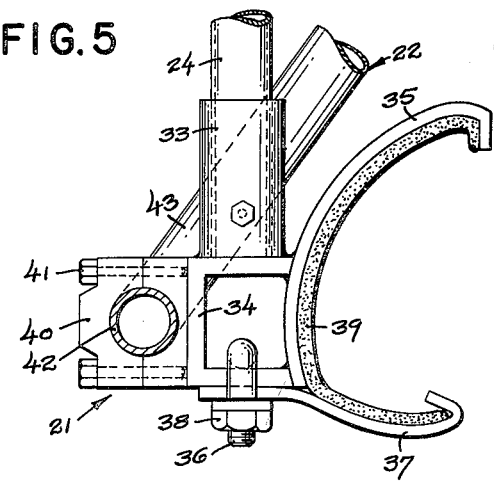
FIG.6
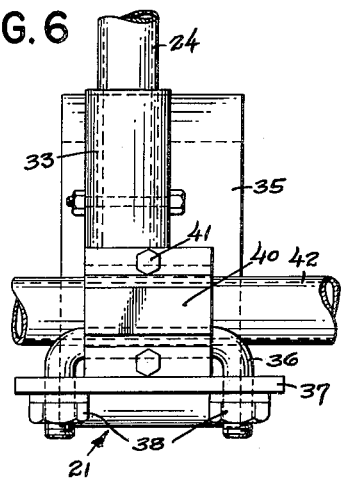
FIG.7
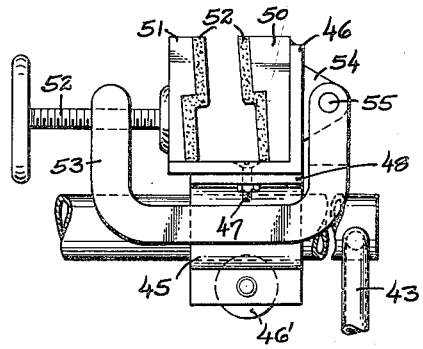
FIG.8
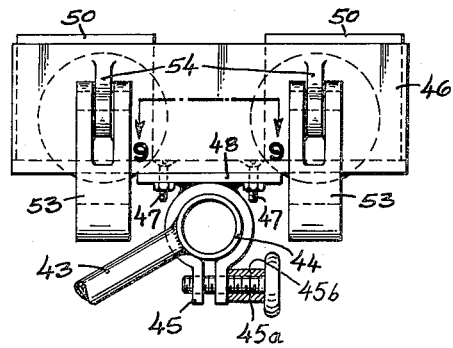
FIG.10  FIG.11  FIG.9
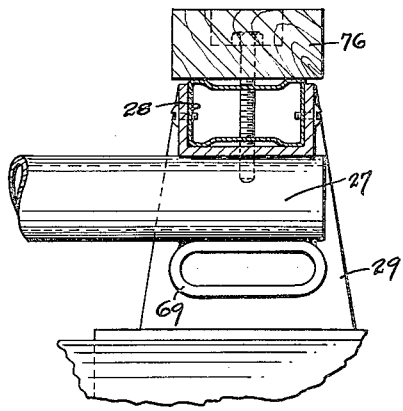 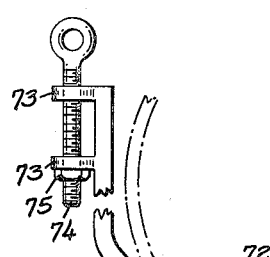
INVENTOR.
CLEMMETT R. GILKISON
BY
ATTORNEYS United States Patent Office 2,985,327
Patented May 23, 1961

2,985,327

BOAT CARRIER AND HOIST FOR AUTOMOBILES

Clemmett R. Gilkison, 6513 34th SW., Seattle, Wash.

Filed Mar. 3, 1959, Ser. No. 796,866

5 Claims. (Cl. 214—450)

This invention relates to an improved boat carrying rack and loading hoist for hardtop automobiles.

The invention aims to provide apparatus of this character which will enable a single operator to easily load and unload a boat onto and off of the top of an automobile without danger of damage to the boat or car.

Another object is to provide a simple hoist arrangement which will give a complete 180° rotation of the boat during unloading from an upside-down position on the automobile to a right-side-up position when completely unloaded, and vice versa, when loading.

My invention also has for its objects boat carrying and hoisting means that are positive in operation, convenient in use, easily installed in a working position and easily disconnected therefrom, economical of manufacture, relatively simple, and of general superiority and serviceability.

With the above and still additional objects and advantages in view the invention consists in the novel construction and in the adaptation and combination of parts hereinafter described and claimed.

In the accompanying drawings:

Fig. 1 is a side elevational view of my apparatus in operative position and with the various stages in lowering the boat being indicated by broken line positions.

Fig. 2 is a fragmentary top plan view of the apparatus.

Fig. 3 is a side elevational view to an enlarged scale of one of the clamping devices for the front roof-supported cross-arm of the carrier.

Fig. 4 is a detail view taken as shown by line 4—4 of Fig. 2.

Figs. 5 and 6 are side and rear elevational detail views, respectively, of one of the rear bumper mounting devices for the swing frame.

Figs. 7 and 8 are rear and outer-side elevational views of the boat clamping device at the right side of the swing frame.

Fig. 9 is a top detail view taken as indicated by the line 9—9 of Fig. 8.

Fig. 10 is a transverse vertical sectional view through the front cross-arm of the carrier and looking toward the left end thereof; and Fig. 11 is a side elevational view of one of the bumper clamps for the tie-down lines.

Referring to the drawings it is seen that my boat loading and carrying device has a carrier frame 20 which is supported at the back by suitable clamps 21 on the rear bumper of the vehicle and at the front on the vehicle roof. This carrier frame provides lower journals for a rectangular swing frame 22 and has a winch 23 for powering the swing frame between a rearwardly directed boat lauching position and a forwardly sloped boat stowing position in which the vehicle is straddled and the boat is supported upside down by the carrier frame. During the travel of the swing frame between these two positions the boat is turned end for end.

The carrier frame 20 can be various constructions, and for purposes of example I have shown such as comprising a pair of rear standards 24 connected together at the top by a cross-brace 25 and to respective longitudinal side bars 26—27 which are connected at the front to a cross-arm 28. This cross-arm can be a conventional automobile luggage rack bar of the suction cup-strap fastener type or the illustrated variety having rigid concavo-convex pads 30 at its ends resting on the arched side portions of the roof and clamped to the side gutters 31 thereof by levered hooks 32. Bracket legs 29 interfit with slots in the pads 30 and support the cross-arm 28.

As best shown in Figs. 5–6, the standards 24 are seated in tubular sockets 33 provided by the respective clamps 21. The socket of each clamp is welded to the upper of the flanges of a forwardly faced channel section 34 both of whose flanges are in turn welded to an upper arcuate jaw component 35. A U-bolt 36 straddles the lower flange of the channel 34 and passes through a lower jaw component 37 where it receives nuts 38 to draw the jaws together. In this regard it will be noted that the jaws are hooked inwardly at their opposite ends to grip the side edges of the bumper and may be lined with sponge rubber 39.

A respective bearing block 40 is held by bolts 41 against the web of each of the channel sections 34 to receive a cross-bar 42 of the swing frame 22. This cross-bar extends beyond the sides of the vehicle and has its ends secured at the root end of the pair of swing arms 43 which are interconnected at their swinging end by a second cross-bar 44. Sleeved on the latter are a pair of split clamping rings 45 each having pierced opposed ears receiving, one threadably, a handled locking bolt 45a which has a spacer 45b thereon for bearing against the other ear. These rings 45 each carry a boat clamp which has an angle piece 46 adjustably held by bolts 47 on a mounting plate 48 welded atop the corresponding clamping ring. The angle pieces 46 each have a transverse arcuate slot 49 for one of the bolts 47 so that the angularity of the boat clamps relative to one another can be adjusted for various boat contours. Each of the boat clamps has two longitudinally spaced pairs of jaw plates one component 50 of each pair being secured to the upright flange of the related angle piece 46 and the other components 51 being slidable laterally on the angle piece. Desirably the opposed faces of the jaws 50—51 are recessed at their lower portions to fit around the gunwale of the boat and may be lined with sponge rubber 52. The jaw 51 is mounted on the screws 52 of a pair of swingable C-clamps 53. These may be forked at their opposite ends to straddle anchor ears 54 projecting from the back of the respective angle piece 46 and receiving pivot pins 55.

Continuing to the winch 23, the shaft 56 thereof is journaled in a pair of alined pipe sections 57—58 which are welded on respective bearing plates 59 resting on the side bars 26—27 of the carrier frame. These bearing plates are apertured to each receive a pair of U-bolts 60 straddling the related side bar to clamp the pipe sections 57—58 in position. The spool 61 of the winch is centrally located and has its line 62 passing around a pulley 63 mounted by a clevis 64, on the swinging cross-bar 44 and back to an eyed anchor collar 65 free turning on the winch shaft 56. To manually turn the latter it is provided at one end with a wheel 66. The pipe section 57 and the related portion of the shaft 56 are formed with a series of circumferentially spaced holes for receiving a pin 67 to selectively lock the winch, and hence enable the swing frame to be locked in a variety of points along its swing path.

While the swing frame 22 is in operation it is important that the carrier frame 20 be retained against fore-and-aft movement relative to the vehicle upon which it is mounted. For this reason I provide a pair of depending eyes 69 at the front end of the side bars 26—27 to receive forwardly and rearwardly extending tie-down straps or lines 70—71. These pass to the front and rear bumpers of the automobile to respective fittings illustrated in Figure 11. It is seen that these fittings each comprise a bumper hook 72 for gripping the bottom edge of the bumper and having an upright portion presenting a pair of vertically spaced lugs 73. The latter have registering holes to receive an eye-bolt 74 adjustably restrained against upward movement by a nut 75, the respective tie-down line being tied to the eye of the bolt. It has been found convenient to run the rear tie-down lines 71 to a single fitting centrally mounted on the rear bumper. The tie-down lines 70—71 need be used only when the boat is being raised and lowered.

When the boat is in stowed position on the automobile it rests upside down with its bow directed toward the front of the car. Its gunwale rests upon the pipe sections 57—58 and the cross-brace 25 at the rear and upon a wood pad 76 at the front which is bolted to the cross-arm 28. At the same time the gunwale is gripped by the jaws 50—51 of the boat clamps which thereby hold the boat against vertical, lateral and endwise movements relative to the vehicle.

To launch the boat, the operator removes the lock pin 67 and begins to turn the winch handle 66 in the counter-clockwise direction as viewed in Figure 1, thereby causing the line 62 to wind up on the spool 61. This action tends to force the cross-bar 44 toward the winch shaft 56, and as a result, the swing frame 22 commences a rearward swing about the journals of the bearing blocks 40. Winding up of the line 62 is continued until the cross-bars 42 and 44 of the swing frame are in straddling alinement with the winch shaft 56, such being designated as Position 2 in Figure 1. At this point the center of gravity of the boat should be slightly rearward of the winch shaft, and this can be set for a given boat by adjusting the fore-and-aft position of the winch shaft by means of the U-bolts 60. The operator then begins to slowly let out on the winch and the swing frame is permitted to swing rearwardly under the influence of the boat's weight until the boat is about upright (Position 3) whereupon the winch shaft is again locked by the pin 67. Clamping rings 45 are then loosened so that the boat can be pivoted stern first as shown by the dotted arrow in Figure 1 to a generally parallel relation to the swing frame (Position 4). This pivoting from Position 3 to Position 4 is normally nearly effortless because the center of gravity of the boat in Position 3 will usually be rearward of the swing frame. When the boat is in Position 3 the clamping rings 45 are again tightened and the locking pin 67 is removed so that the operator can further ease off on the winch until the boat is fully lowered. During this last lowering stage the winch line 62 will come into engagement with the cross-brace 25, and for this reason I prefer to provide the latter with a central roller 77. The boat can be readily stowed by reversing these launching steps. In locations wherein an automobile can be backed safely to the water's edge or onto a low dock, the boat can be directly launched or retrieved therefrom.

It is thought that the invention will have been clearly understood from the foregoing detailed description of the illustrated now-preferred embodiment. Modifications may be resorted to without departing from the spirit of the invention and I accordingly intend that no limitations are to be implied and that the hereto annexed claims be given a scope fully commensurate with the broadest interpretation to which the employed language fairly admits.

What I claim is:

1. A combination boat hoist and carrier for automotive vehicles comprising, a carrier frame adapted to be mounted on a vehicle and restrained against movement relative to the latter, said frame providing front and rear elevated supports for directly supporting a boat thereon in a stowed upside down position longitudinal of the vehicle, a swing frame pivotally mounted at a root end in operative relation to said carrier frame below the level of said supports for fore-and-aft swinging movement about a transverse swing axis between boat launching and stowing positions, a pair of laterally spaced boat gripping means adjustably clamped on the swing end of said swing frame whereby said boat gripping means can be selectively turned about an axis parallel to said swing axis, winch means mounted on said carrier frame rearwardly of said front support and operatively associated with said swing frame for raising and lowering it, said swing frame being longer than the distance from said winch means to said root end of the swing frame so that said gripping means is located forwardly of the winch means when the boat is in stowed position, whereby a boat can be swung and turned end for end between an elevated upside down stowed position on said supports and a lowered upright launching position rearwardly of the vehicle on which the carrier frame is applicable.

2. A combination boat hoist and carrier for automotive vehicles comprising, a carrier frame adapted to be mounted on a vehicle and restrained against movement relative to the latter, said frame providing front and rear elevated supports for directly supporting a boat thereon in a stowed upside down position longitudinal of the vehicle, a swing frame pivotally mounted at a root end in operative relation to said carrier frame below the level of said supports for fore-and-aft swinging movement between boat launching and stowing positions, and presenting a cross-arm at its swing end, a pair of boat gripping means adjustably clamped to said cross-arm whereby said boat gripping means can be selectively turned about the cross-arm, winch means mounted on said carrier frame rearwardly of said front support and operatively associated with said swing frame for raising and lowering it, said swing frame being longer than the distance from said winch means to said root end of the swing frame so that said gripping means is located forwardly of the winch means when the boat is in stowed position, whereby a boat can be swung and turned end for end between an elevated upside down stowed position on said supports and a lowered upright launching position rearwardly of the vehicle on which the carrier frame is applicable.

3. A combination boat hoist and carrier for automobiles comprising, a carrier frame adapted to be mounted on the rear bumper and top of an automobile, said frame providing a pair of longitudinal members and being arranged to carry a boat in a stowed upside down position longitudinal of the automobile, a swing frame pivotally mounted on said rear bumper for fore-and-aft swinging movements between boat launching and stowing positions, and presenting a cross-arm at its swing end, boat gripping means adjustably clamped to said cross-arm whereby said boat gripping means can be selectively turned about the cross-arm, winch means having a journaled shaft carried by said longitudinal members and a drum therebetween, a winch line passing from said drum to a pulley mounted on said cross-arm and back to an anchor connection with said winch shaft, said winch shaft being rearwardly of said cross-arm when said swing frame is in its boat stowing position, whereby a boat can be swung and turned end for end between an elevated upside down stowed position on said carrier frame and a lowered upright launching position rearwardly of the automobile.

4. The structure of claim 3 in which said winch shaft is adjustable along said longitudinal members so that the center of gravity of the boat can be set rearward of the winch shaft when the swing frame is elevated such that the winch shaft lies in its plane.

5. The structure of claim 4 in which means are provided for selectively locking said winch shaft.

References Cited in the file of this patent

UNITED STATES PATENTS

| | | |
|---|---|---|
| 2,042,753 | Wilson | June 2, 1936 |
| 2,247,128 | Levey | June 24, 1941 |
| 2,561,199 | Harder | July 17, 1951 |
| 2,670,113 | Ellingson | Feb. 23, 1954 |